United States Patent [19]

Handler et al.

[11] Patent Number: 5,064,156

[45] Date of Patent: Nov. 12, 1991

[54] ADJUSTABLE HEIGHT WORK SUPPORT

[75] Inventors: Milton E. Handler, Northbrook; Richard Sylvan, Glenview; Herbert Baisch, Palatine; Michael Naranjo, Des Plains, all of Ill.

[73] Assignee: Hirsh Company, Skokie, Ill.

[21] Appl. No.: 508,805

[22] Filed: Apr. 12, 1990

[51] Int. Cl.5 ............................................. F16M 11/38
[52] U.S. Cl. .................................... 248/168; 269/901
[58] Field of Search ............... 248/125, 168, 169, 170, 248/171, 434; 269/901

[56] References Cited

U.S. PATENT DOCUMENTS

| 229,132 | 11/1973 | Uroshevich . | |
|---|---|---|---|
| 252,780 | 9/1979 | Green . | |
| 253,323 | 11/1979 | Blatzer et al. . | |
| 268,458 | 4/1983 | Schoenig . | |
| 274,782 | 7/1984 | Little . | |
| 282,320 | 1/1986 | Anderson . | |
| 293,052 | 12/1987 | Handler et al. . | |
| 1,659,113 | 2/1928 | Marks | 248/169 |
| 1,673,721 | 6/1928 | Turner . | |
| 2,094,486 | 9/1937 | Cohen . | |
| 2,376,238 | 5/1945 | Dixon . | |
| 2,554,599 | 5/1951 | Stovern . | |
| 3,970,278 | 7/1976 | Studer . | |
| 4,117,784 | 10/1978 | Piretti . | |
| 4,155,386 | 5/1979 | Alessio | 269/901 X |
| 4,378,100 | 3/1983 | Minozzi et al. | 248/168 |
| 4,415,149 | 11/1983 | Rees | 269/901 X |
| 4,492,354 | 1/1985 | Rice . | |
| 4,609,174 | 9/1986 | Nakatani | 248/168 X |
| 4,648,585 | 3/1987 | Yang | 269/901 X |
| 4,648,778 | 3/1987 | Schultz | 248/168 X |
| 4,699,343 | 10/1987 | Handler et al. . | |

FOREIGN PATENT DOCUMENTS

| 171385 | 8/1950 | Australia | 248/168 |
|---|---|---|---|
| 318210 | 6/1934 | Italy . | |

OTHER PUBLICATIONS

Page 58 of Woodworker's Supply of New Mexico Showing "Adjustable Height Roller Stand" and New Extra Heavy-Duty Roller Stands.
Sears, Roebuck & Co. Cat. No. 9-2955 ©1959, p. 173 "Accra-Arm Tool Portable Bench".
"Marvco Rolmate" Advertisement.
Page 16 of *Woodworker's Supply of New Mexico* Catalog Showing.
"Adjustable Height Roller Stand".

Primary Examiner—Gary L. Smith
Assistant Examiner—Michael J. Milano
Attorney, Agent, or Firm—Robert S. Beiser

[57] ABSTRACT

A workpiece support apparatus is provided with a pair of pivotable leg assemblies which are movable between a first, open position, and a second, closed position. A releasable latch member is provided for holding the leg assemblies in a selected one of the open and closed positions. The apparatus includes a vertically adjustable work support assembly which can be locked at a desired height.

11 Claims, 2 Drawing Sheets

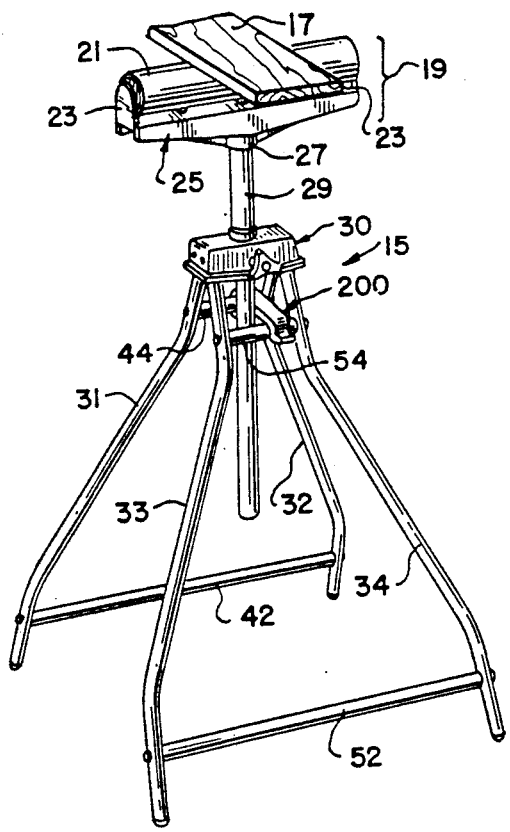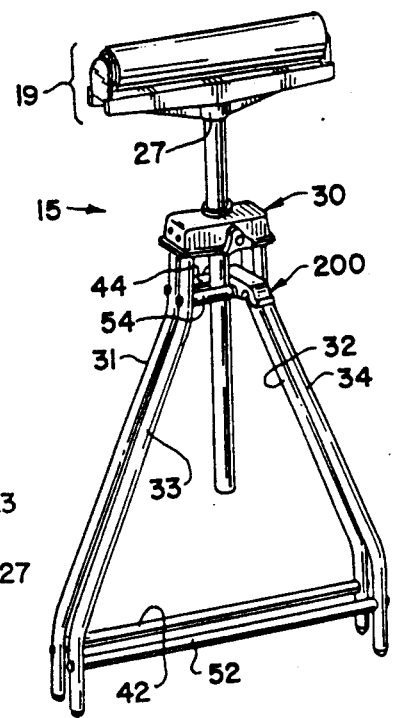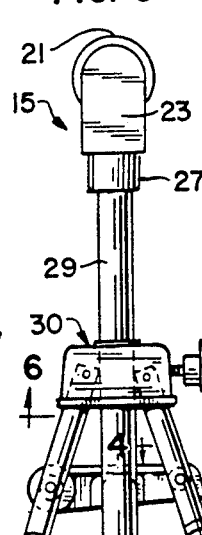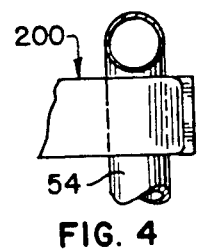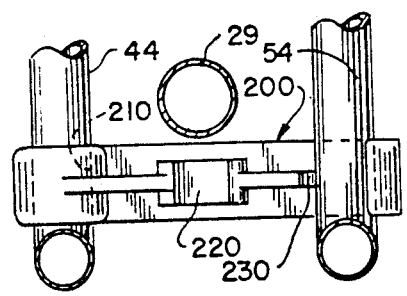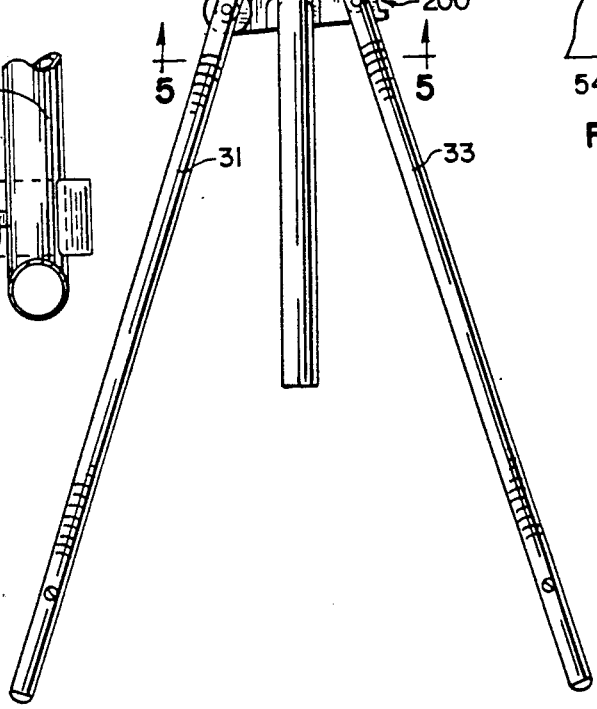

5,064,156

ADJUSTABLE HEIGHT WORK SUPPORT

TECHNICAL FIELD

This invention relates to a support for workpieces and, more particularly to a support which is readily adjustable, collapsible, and portable for use as an adjunct to work benches, tables, or machines and power tools, such as table saws.

BACKGROUND OF THE INVENTION AND TECHNICAL PROBLEMS POSED BY THE PRIOR ART

When performing carpentry or machining operations, it is sometimes desirable to provide support for portions of the workpiece. For example, long pieces of lumber, or large sections of sheet metal or wall paneling, cannot usually be properly supported solely by the work station bench or table at which an operation is being performed on the workpiece with a router, radial saw, table saw, or the like. Under such conditions, an additional support apparatus is typically employed to support the portion of the workpiece extending outwardly from the tool.

A number of work support devices have been proposed and marketed. While such devices may be generally satisfactory, it would be desirable to provide an improved work support which could offer improved stability, ease of operation, and portability.

Further, it would be advantageous if such an improved work support had a design which would accommodate fabrication from conventional types of components with a minimum amount of more complex structural features. This would facilitate fabrication and reduce manufacturing costs.

Further, it would be beneficial if such an improved work support could be provided with a means for adjusting the height of the work support and providing an effective, yet easily operable, means for locking the work support at the desired height.

A workpiece support device is typically moved from one location to another depending upon the size and nature of the workpiece. Further, when such a workpiece support device is not needed, it would be desirable to provide means for easily accommodating storage of the device. Accordingly, it would be desirable to provide an improved workpiece support device which could be collapsed to some extent. Such an improved device should advantageously employ an effective, and easily operable, system for locking the device in the "in use" position as well as in the collapsed position to facilitate transport and storage of the device.

Finally, it would be desirable to provide an improved workpiece support device which could be readily assembled from a plurality of individual components which could be relatively easily and inexpensively manufactured. This would accommodate the packaging and sale of the device in a knocked-down form for subsequent assembly by the purchaser or user. Such a "knocked-down" design should also desirably incorporate suitable structural features to provide sufficient rigidity when assembled and placed in use.

SUMMARY OF THE INVENTION

The present invention provides a collapsible and adjustable height workpiece support device. The device has a base which includes first and second leg means for extending upwardly from a floor.

A junction means is provided for receiving and pivotally holding the first and second leg means for pivoting movement between a closed position and an open position.

A releasable latch means is provided for holding the first and second leg means in a selected one of the closed and open positions. In a preferred embodiment, the latch means includes a latch member defining a first engaging means for engaging and holding the second leg means in the closed position, and the latch means defines a second engaging means for engaging and holding the second leg means in the open position.

Finally, a vertically adjustable work support assembly is carried by the junction means. In a preferred form, the work support assembly includes a vertically disposed extension member slidably received in the junction means and further includes a generally laterally extending workpiece engaging member for engaging and supporting at least a portion of the workpiece.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a perspective view of the adjustable height workpiece support device of the present invention shown in an open position supporting a portion of a workpiece;

FIG. 2 is a perspective view similar to FIG. 1 but showing the device in the folded closed position;

FIG. 3 is an enlarged, side elevational view of the device shown in the open position;

FIG. 4 is a greatly enlarged, fragmentary, partial, cross-sectional view taken generally along the plane 4—4 in FIG. 3;

FIG. 5 is a greatly enlarged, fragmentary, partial, cross-sectional view taken generally along the plane 5—5 in FIG. 3;

DESCRIPTION OF THE PREFERRED EMBODIMENT

Figure 6:
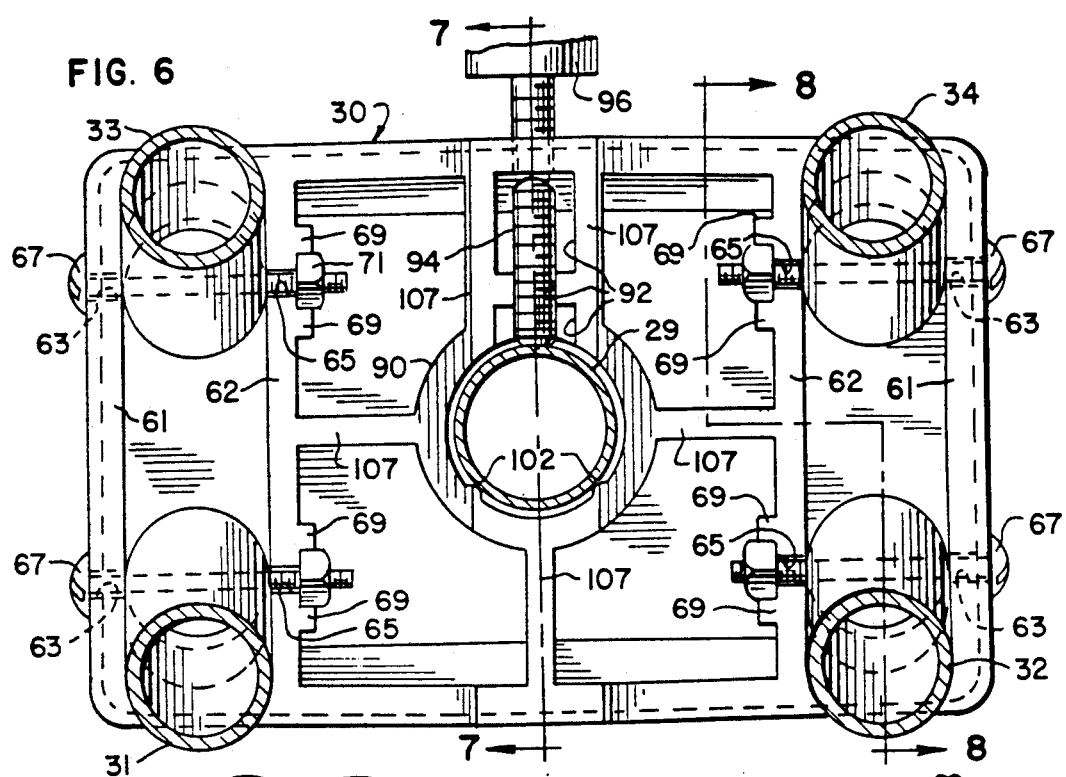
FIG. 6 is a greatly enlarged, fragmentary, cross-sectional view taken generally along the plane 6—6 in FIG. 3.

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus of this invention is described in the normal (upright) operating position, and terms such as "upper", "lower", "horizontal", etc., are used with reference to this position. It will be understood, however, that the apparatus of this invention may be manufactured, stored, transported, and sold in an orientation other than the position described.

The apparatus of this invention includes certain conventional structural components the details of which, although not fully illustrated or described, will be apparent to those having skill in the art and an understanding of the necessary functions of such components.

The workpiece support apparatus or device of the present invention is designated generally by reference numeral 15 in FIGS. 1–3. The device 15 is intended to function for supporting a portion of a workpiece, such as an extending portion of a board 17 as illustrated in FIG. 1.

The device 15 includes a generally laterally extending workpiece support assembly 19. The assembly 19 is adapted to engage the underside portion of the workpiece 17. The assembly 19 includes a cylindrical roller 21 which is mounted at each end to a retainer bracket 23. Each bracket 23 includes a suitable shaft means (not visible in FIG. 1) to accommodate rotation of the cylindrical roller 21 about its axis.

Each bracket 23 is mounted to a roller support member 25. To this end, each bracket 23 is preferably L-shaped and includes a foot portion (not visible in FIG. 1) which extends under an end of the roller support member 25 and which is fastened thereto with suitable fasteners (not visible).

In a preferred form of the device, the roller is fabricated from steel tubing having a thickness of about 0.045 inch, the brackets 23 are fabricated from polystyrene, and the roller support member 25 is also fabricated from polystyrene.

As illustrated in FIGS. 1–3, the roller support member 25 includes centrally disposed downwardly depending collar 27. The collar 27 receives the upper distal end of a vertically disposed extension member 29. In a preferred form of the invention, the extension member 29 is a cylindrical, metal tube which is carried by, and which is vertically adjustable relative to, a junction means for member 30. As best illustrated in FIGS. 3 and 6–8, the junction member 30 receives and pivotally holds four legs 31, 32, 33, and 34 which together constitute a base for being supported by, and for extending upwardly from, a floor.

The pair of legs 31 and 32 may be characterized as a first leg means or leg assembly, and the pair of legs 33 and 34 may be characterized as a second leg means or leg assembly. As can be seen from comparing FIG. 1 and FIG. 2, the first leg assembly (legs 31 and 32) and the second leg assembly (legs 33 and 34) are pivotally mounted to the junction member 30 for movement between a closed position (FIG. 2) and an open, "in use" position (FIG. 1).

Each leg 31, 32, 33, and 34 is identically shaped and, in the preferred form of the invention, is fabricated from metal lock-seamed tubing having a nominal outside diameter of 0.875 inch. As illustrated in FIG. 1, the first leg assembly of legs 31 and 32 further includes a lower strut 42 and an upper cross member 44. Similarly, the second leg assembly of legs 33 and 34 includes a lower strut 52 and an upper cross member 54. The lower struts 42 and 52 and the upper cross members 44 and 54 are preferably fabricated from the same kind of lock-seamed tubing as is used for the legs 31, 32, 33, and 34.

Each end of each lower strut 42 and 52 and each end of each upper cross member 44 and 54 is connected with suitable conventional or special means to an adjacent leg. In a preferred form of the invention illustrated, each such connection employs the tube connector assembly described in the recently allowed, commonly assigned, copending U.S. Pat. application Ser. No. 07/211,986.

Figure 7:
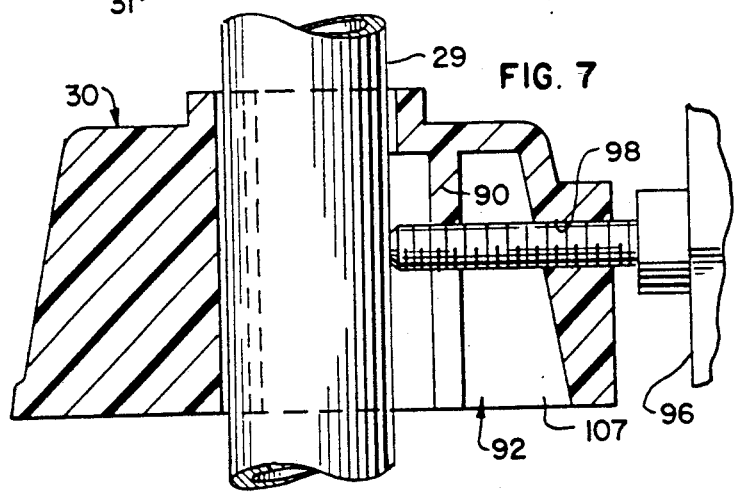
FIG. 7 is a fragmentary, cross-sectional view taken generally along the plane 7—7 in FIG. 6.
Figure 8:
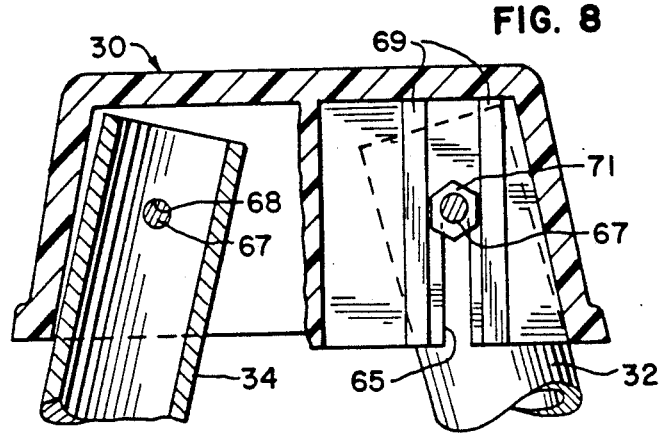
FIG. 8 is a fragmentary, cross-sectional view taken generally along the planes 8—8 in FIG. 6.

As illustrated in FIGS. 6–8, the upper distal end of each leg 31, 32, 33, and 34 is received in the junction member 30. The junction member 30, in the preferred form illustrated, may be conveniently fabricated from a conventional synthetic polymer structural foam.

The junction member 30 has two ends or regions with one end receiving legs 31 and 33 and with the other end receiving legs 32 and 34. The junction member 30 defines a pair of spaced-apart walls 61 and 62 at each end, and the legs are received between these walls. Each wall 61 may be characterized as an exterior wall, and each wall 62 may be characterized as an interior wall spaced inwardly of the exterior wall 61.

Each wall 61 defines two laterally spaced-apart apertures 63. Each wall 62 also defines two laterally spaced-apart apertures 65. Each wall aperture 65, in the preferred embodiment illustrated, is provided as a slot in the interior wall 62 and the slots are aligned across from the apertures 63 for accommodating screws 67.

The upper distal end of each leg 31, 32, 33, and 34 defines a hole in the form of two spaced-part, aligned apertures 68 in the tubular wall of the leg for receiving one of the screws 67 so that the screw projects on one side of the leg through the exterior wall aperture 63 and projects on the other side of the leg through the interior wall aperture 65. Each screw 67 functions as a pivot shaft about which a leg pivots relative to the junction member 30.

The head of each screw 67 engages the outer surface of the exterior wall 61, and the distal, threaded end of each screw 67 extends through and beyond the interior wall 62.

The junction member 30 further includes a pair of ribs 69 on opposite sides of each inner wall aperture 65. A nut 71 is threaded on each screw 67. During the initial assembly, the nut 71 is threaded only a short distance onto the end of the engaged screw 67. The engaged screw 67 and nut 71 are then pulled outwardly relative to the junction member 30 so as to trap the oppositely directed faces of the nut 71 between the ribs 69. A slight rotation of the nut 71 may be required to properly position the nut 71 between the ribs 69 where it is then trapped and restrained from rotation relative to the screw 67. The screw 67 can then be rotated in the direction to further increase the threaded engagement with the nut 71 so as to draw the head of the screw 67 tight against the exterior wall 61 and so as to draw the nut 71 tight against the interior wall 62.

As illustrated in FIGS. 6 and 7, the junction member 30 defines a generally centrally disposed, generally cylindrical collar 90 for receiving the extension member 29. The junction member 30 further defines a recess area or slot (generally designated by reference numeral 92) for receiving a threaded shaft 94 extending from a handle or knob 96. The distal end of the threaded shaft 94 is adapted to engage the exterior cylindrical surface of the extension member tube 29. The shaft 94 extends through, and is threadingly engaged with, a threaded aperture 98 defined in the junction member 30. Thus, rotation of the knob 96 in one direction will move the end of the threaded shaft 94 against the extension member tube 29 to lock the tube 29 at a desired vertical elevation, and rotation of the knob 96 in the opposite direction will loosen the extension member tube 29 to permit it to be moved to a new elevation.

To aid in slidably adjusting the height of the extension member tube 29, the collar 90 is preferably provided with a pair of inwardly extending dimples or protrusions 102 which are located generally opposite the locking knob shaft 94. This reduces the amount of frictional contact between the collar 90 and the tube 29 to facilitate vertical adjustment of the tube 29.

The rigidity of the assembly of the tube 29 and junction member 30, when in the locked mode, is additionally insured by the provision of five rigidifying wall members 107 (FIG. 6) which are spaced around, and which are formed unitary with, the collar 90.

A novel releasable latch means is provided for holding the leg assemblies in a selected one of the closed and open positions. Specifically, a latch member 200 is pivotally mounted to the upper cross member 44 as best illustrated in FIGS. 3, 5, 8, 9, and 10. The latch member 200 includes a bore 210 (FIG. 5) for receiving the cylindrical cross member tube 44.

Figure 9:
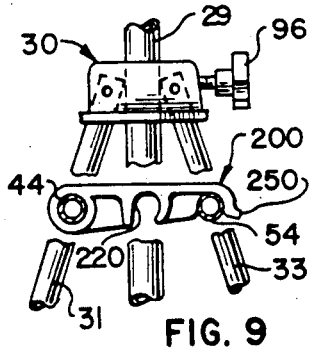
FIG. 9 is a fragmentary, side elevational view of a portion of the device shown in the open position with portions of some of the components broken away to better illustrate interior detail.
Figure 10:
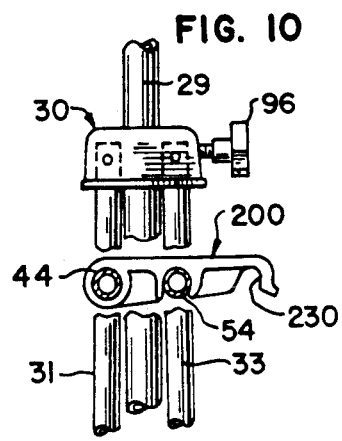
FIG. 10 is a view similar to FIG. 9, but showing the device in the folded closed position.

The latch member 200 includes a first engaging means which, in the preferred form illustrated, is a recess 220, for engaging and holding the second leg assembly cross member 54 when the leg assemblies are in the closed position (FIG. 10). Similarly, the latch member 200 defines a second engaging means which, in the preferred embodiment illustrated, is a recess 230 (FIGS. 5 and 10) for engaging and holding the second leg assembly cross member 54 when the leg assemblies are in the open position (FIG. 9).

In the preferred form of the invention, each recess 220 and 230 is defined by a partially cylindrical surface having a curvature arc length exceeding 180 degrees so as to define a reduced opening into the recess. The second leg assembly cross member 54 is a cylindrical tube having an exterior diameter that exceeds the reduced width opening of each recess 220 and 230 by a small amount. Therefore, the hollow, cylindrical cross member 54 undergoes a temporary deformation to accommodate its reception in the recess in a snap-fit manner.

With this novel latch member 200, the workpiece support device 15 can be easily opened and closed and can be easily "locked" in either one of the open and closed positions as may be desired.

To assist in pivoting the latch member 200 into and out of locking engagement with the cross member 54, the latch member 200 is also preferably provided with an outwardly extending lip 250 which may be conveniently grasped and by which the latch member 200 may be pivoted upwardly or downwardly.

The novel design of the various components of the workpiece support device 15 facilitates relatively easy and inexpensive fabrication. Further, the component designs facilitate relatively easy and rapid assembly by the user.

Although the design of the device 15 readily accommodates assembly by a user from a plurality of components, the device, when properly assembled, provides a relatively rigid support for workpieces which yet has the capability for being vertically adjustable and for being collapsed to a closed position for facilitating transport and/or storage.

It will readily observed from the foregoing detailed description of the invention and from the illustrated embodiments thereof that numerous variations and modifications may be effected without departing from the true spirit and scope of the novel concepts or principles of this invention.

What is claimed is:

1. A support apparatus for work pieces comprising:
    a base including first and second leg means for extending upwardly from a floor;
    a junction means for receiving and pivotably holding said first and second leg means for pivoting movement between a closed position and an open position;
    said first and second leg means each including a pair of leg members which are connected together by a cross member below said junction means, each of said leg members having an upper terminal portion extending upwardly beyond said cross member to said junction means;
    releasable latch means for holding said first and second leg means in a selected one of said closed and opened positions; and
    a vertically adjustable work piece support assembly carried by said junction means;
    said releasable latch means includes a latch member pivotably mounted to said cross member of said first leg means, said latch member defining a first engaging means for engaging and holding said second leg means cross member when said leg assemblies are in said closed position, and said latch member also defining a second engaging means for engaging and holding said second leg means cross member when said leg assemblies are in said open position.

2. The support apparatus in accordance with claim 1 further including a releasable locking means on said junction means for locking said work support assembly at a selected height relative to said junction means.

3. The support apparatus in accordance with claim 1 in which
    each said cross member is a horizontally disposed tube; and
    each said first and second engaging means of said latch member each define a recess for receiving said second, leg means cross member.

4. The support apparatus in accordance with claim 3 in which
    each said recess of said latch member is defined by a partially cylindrical surface having a curvature arc length exceeding 180 degrees so as to define a reduced width opening into said recess; and
    said second leg means cross member is a cylindrical tube having an exterior diameter exceeding said reduced width opening of each said recess of said latch member whereby a temporary deformation of said cross member tube accommodates the reception of said tube in each said recess in a snap-fit manner.

5. The support apparatus in accordance with claim 3 in which
    each said upper terminal portion of each said leg defines a hole;
    said junction means has two ends;
    said junction means defines a pair of spaced-apart walls at each end between which are received said upper terminal portions of said legs of one of said pairs;

each said wall of one of said pair of walls defines two laterally spaced apertures aligned across from the two apertures in the other wall of said one pair of walls;

said support apparatus further includes four screws, one screw being associated with one of said legs and extending through said hole in said one of leg upper terminal portions and projecting on each side of said leg through one of said wall apertures; and said support apparatus further includes four nuts, one nut being threaded onto one of said screws adjacent one of said walls.

6. The support apparatus in accordance with claim 5 in which each said pair of walls includes an exterior wall at the exterior of said junction means and an interior wall spaced inwardly of said exterior wall; and said junction means defines a pair of ribs on said interior wall with the interior wall aperture being located between said ribs for trapping one of said nuts to prevent rotation on one of said screws.

7. The support apparatus in accordance with claim 1 in which said work support assembly includes a laterally extending workpiece support engaging member for being positioned to engage and support at least a portion of said workpiece and further includes a generally vertically disposed, generally cylindrical extension member mounted to said workpiece engaging member; and said junction means defines a generally centrally disposed, generally cylindrical collar for receiving said extension member.

8. The support apparatus in accordance with claim 7 further including a threaded locking member threadingly engaged with said junction means for being advanced against said extension member to lock it at a selected height relative to said junction means.

9. A support apparatus for workpieces comprising:

a generally laterally extending workpiece engaging member for being positioned to engage and support at least a portion of said workpiece;

a generally vertically disposed extension member mounted to said workpiece engaging member;

a junction member defining a guide way for slidably receiving a portion of said extension member in a generally vertical orientation;

first and second leg assemblies pivotably mounted to said junction member for movement between a closed position and an open position; and a latch member pivotably mounted to said first leg assembly, said latch member defining a first engaging means for engaging and holding said second leg assembly when said leg assemblies are in said closed position, said latch member defining a second engaging means for engaging and holding said second leg assembly when said leg, assemblies are in said open position.

10. The support apparatus in accordance with claim 9 further including spaced-apart, parallel shafts carried by said junction member and in which each said leg assembly defines at least one aperture for receiving a portion of one of said shafts to define a pivot axis of said leg assembly.

11. The support apparatus in accordance with claim 9 further including a manually operable locking means on said junction means for engaging said extension member to hold it at a selected elevation relative to said junction means.

* * * * *